R. S. TOWNE & F. B. FLINN.
PROCESS FOR SEPARATING ORE MATERIALS FROM EACH OTHER.
APPLICATION FILED FEB. 5, 1913. RENEWED NOV. 20, 1918.
1,295,817.
Patented Feb. 25, 1919.
3 SHEETS—SHEET 2.
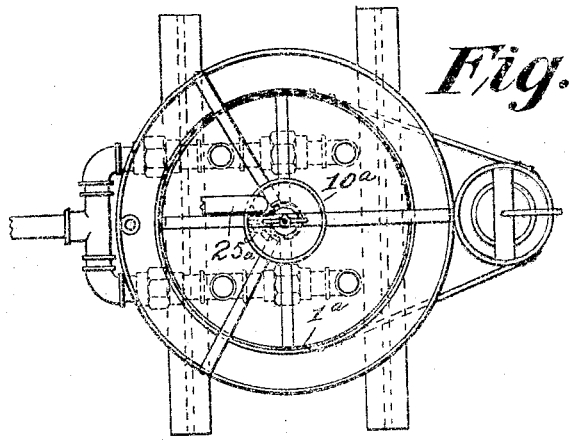
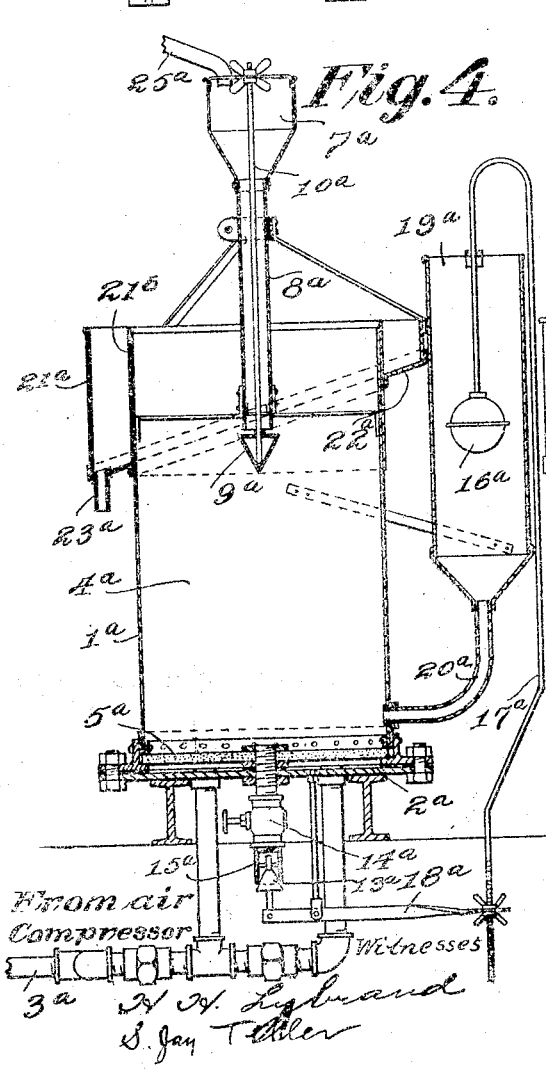
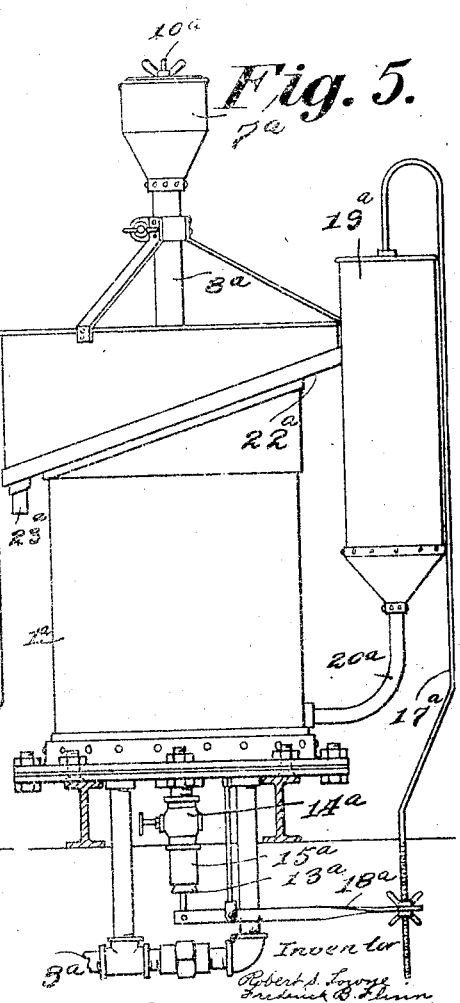

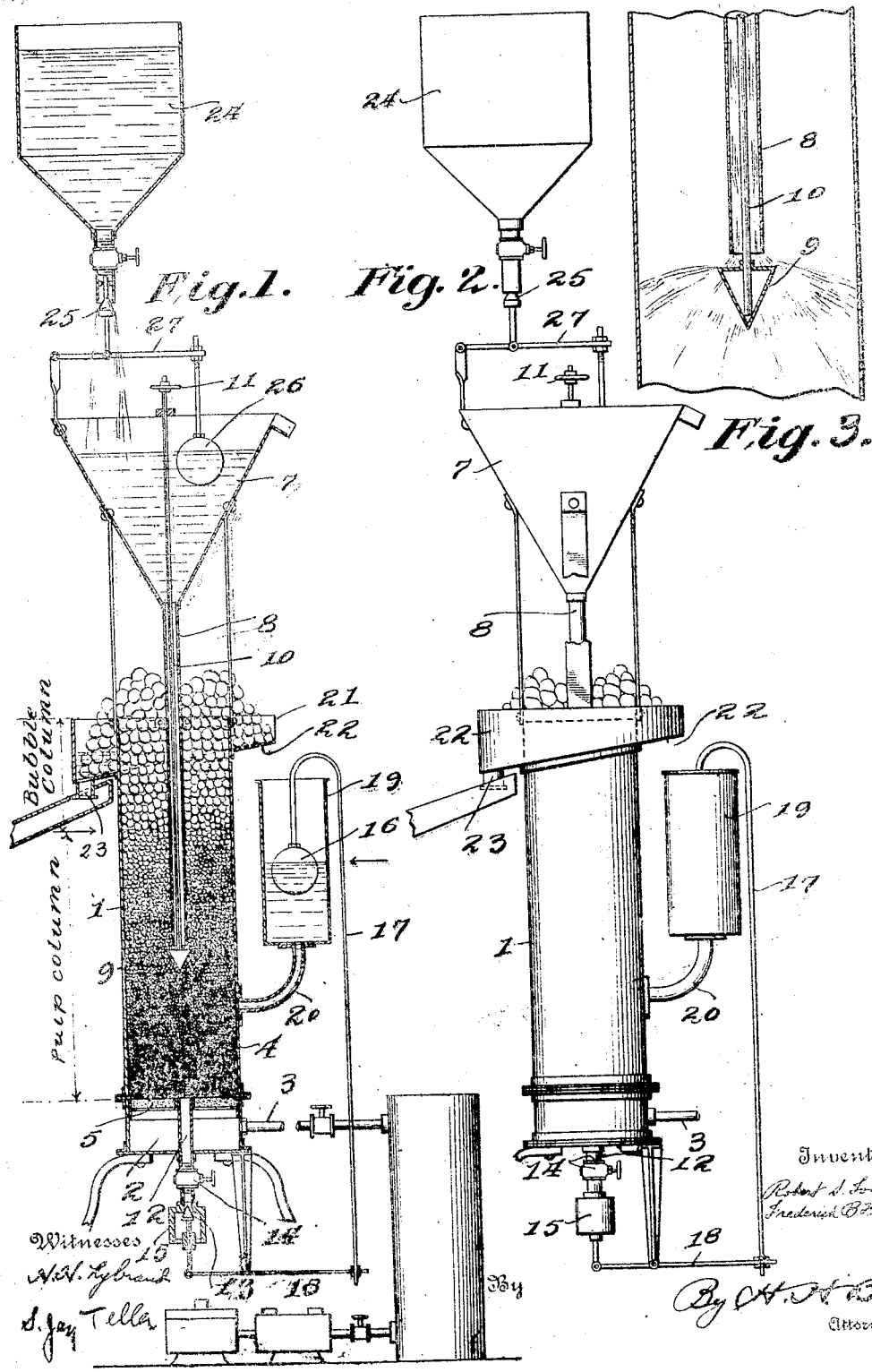

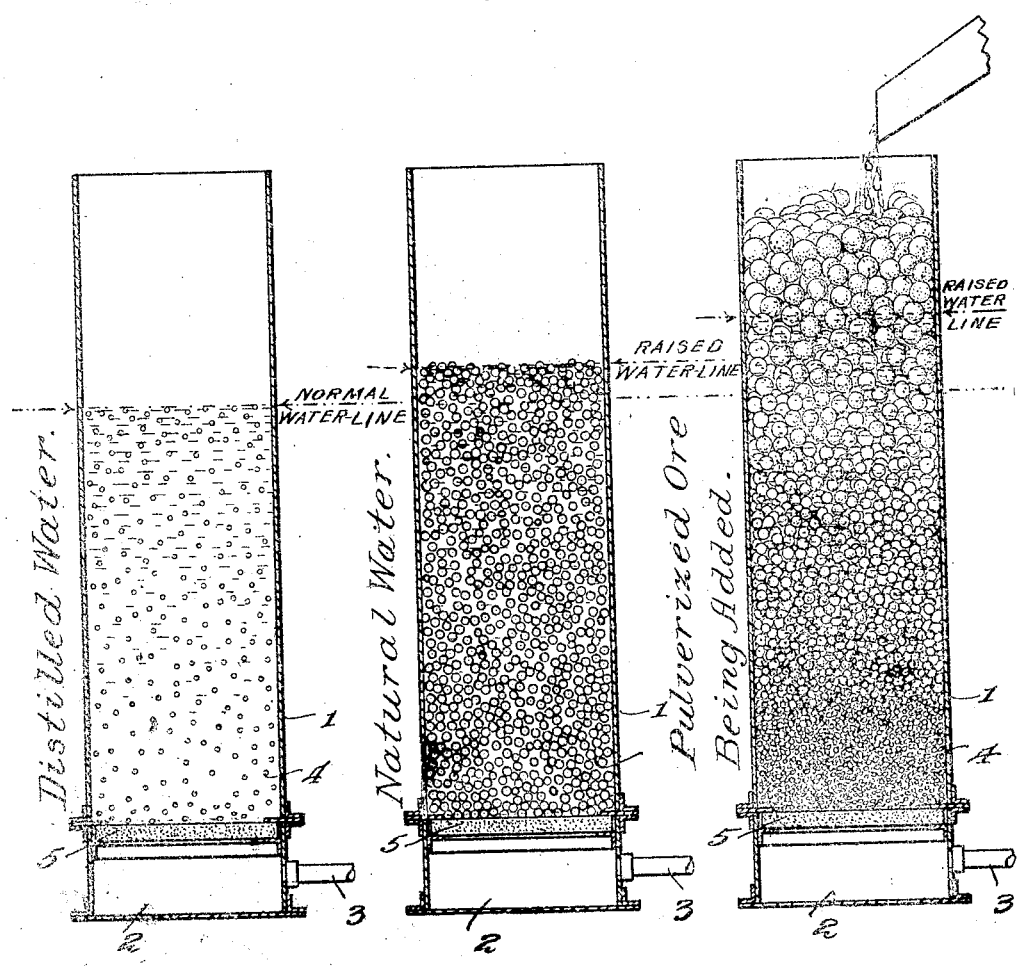

UNITED STATES PATENT OFFICE.

ROBERT S. TOWNE, OF NEW YORK, N. Y., AND FREDERICK B. FLINN, OF ORANGE, NEW JERSEY, ASSIGNORS TO BUBBLE-COLUMN CORPORATION, A CORPORATION OF NEW YORK.

PROCESS FOR SEPARATING ORE MATERIALS FROM EACH OTHER.

1,295,817.

Specification of Letters Patent.

Patented Feb. 25, 1919.

Application filed February 5, 1913, Serial No. 746,369. Renewed November 20, 1918. Serial No. 263,445.

*To all whom it may concern:*

Be it known that ROBERT S. TOWNE, a citizen of the United States, formerly residing in the city, county, and State of New York, and FREDERICK B. FLINN, a citizen of the United States, residing in Orange, county of Essex, State of New Jersey, have invented new and useful Improvements in Processes for Separating Ore Materials from Each Other, of which the following is a specification, reference being had therein to the accompanying drawings.

This invention relates to improvements in methods for separating from the rock material or earthy material of ores the metallic particles or values which they contain, or the compounds of the metals with other substances.

Heretofore methods or processes of a large number have been used, or proposed, for attaining the object at which we aim. It is not necessary to here, even briefly, specify each and all of these older methods, it being sufficient to refer to those of the sub-class wherewith the purpose has been to make available the buoyancy of one set of particles or bodies in relation to those of another set, these being generally termed "flotation methods." And these are here mentioned, not because the present method which we have devised, or the apparatus which we have designed for carrying it out can be fully described as a flotation process or a flotation mechanism, but they are referred to in order that the reader may have something approximate in character with which the present process and mechanism may be compared and contrasted for a fuller understanding.

These flotation processes or methods (or the greater number of them) have depended upon the fact that metals, and metallic compounds, possess the physical attribute of closely contacting and cohering with, or adhering to, oils or oleaginous materials in preference to contacting or cohering with water, and in the presence of both fluids they will select the oil rather than the water; and upon the further fact that the oil bodies have a greater tendency to adhere to or cohere with the metallic or metalliferous bodies than with the non-metalliferous, such as the earthy masses or rock bodies in the ore. Ore rocks or earths are reduced to fineness, and are then, in one way or another, commingled with water and oil, or oleaginous material, and the latter, as aforesaid, uniting by preference with the metallic, or metalliferous bodies, are made relatively more buoyant than they are in their natural state. Under the action of this relative buoyancy their tendency is to come to the surface of the body of the liquid, such as water. The theory of the earlier processes or methods has been that when the solid particles reach the surface of the suspending liquid, it would be possible to effect a separation not only of the metalliferous particles from the water but also their separation from the non-metalliferous solid particles. And in the earlier methods with which we are acquainted, the separation of the solid masses from the liquid occurred immediately at the surface of the water body. Experience has shown that it is not possible to effect a perfect separation in either of these respects by following this procedure.

Long observation and experimenting in connection with all of these processes which have come to our knowledge, have led to our observing numerous characteristic phenomena, and to the discovery of several matters which we believe to be new in this art, and which we have made available in effecting rapidly, completely and economically the separation of the metalliferous value part of an ore mass from the non-metalliferous rock or earth bodies.

In order to convey an understanding of these phenomena and the matters which we have discovered, we have illustrated in the drawings mechanism which can be operated in such way as to carry on the necessary actions of the materials, and will assist in reaching such an understanding.

In the drawings, Figure 1 is a central vertical section of an apparatus embodying our improvements in mechanism available for carrying out our process;

Fig. 2 is a side elevation;

Fig. 3 is an enlarged detail sectional view of a part of the apparatus shown in Figs. 1 and 2.

Fig. 4 is a central vertical section of a modified form of apparatus;

Fig. 5 is a side elevation of the apparatus shown in Fig. 4;

Fig. 6 is a plan view of the apparatus shown in Figs. 4 and 5;

Figs. 7, 8 and 9, are vertical, sectional views of a diagrammatic form to illustrate various phenomena, an understanding of which will assist in appreciating the characteristic matters that are incident to our method and mechanism.

1 indicates a liquid-tight tank, vat or suitable receptacle. As shown in the drawings, it is cylindrical and of suitable diameter and height. Several forms are shown in the drawings.

Regarding the devices shown conventionally or diagrammatically in Figs. 7, 8 and 9, the tank or receptacle has an air chamber 2 at the bottom, adapted to communicate with a source of supply of compressed air, as by means of the pipe 3 connected to the wall of the chamber. The partition wall or separator 5 between this air chamber and the chamber 4, above it, in the body of the tank, is made of material which is permeable to air under pressure, such as a thick layer of cloth of fine mesh, or several such cloth layers closely superposed, or a perforated metallic plate, or a series of such plates, or a section or superposed sections of fine screen mesh, or some artificially made porous body, such as earthenware, emery, corundum, or the like. It is merely necessary that it should cause the body of air to be broken up into a large number of minute streams or jets which travel through it and which furnish at its upper surface numerous closely and uniformly distributed bubbles. We have found that for this purpose use can be made to advantage of the disks of carborundum found in the market and manufactured for grinding or abrading purposes.

Now, if with devices, such as shown in Figs. 7, 8 and 9, a body of distilled water is introduced in the chamber 4 in receptacle 1, and then air be admitted under pressure to the bottom chamber 2, a mass of air globules will be seen to rise through the water as soon as they reach the surface but they will be found to be evanescent and without durability, but no true "bubbles" are formed, as generally understood.

If, instead of distilled water, a natural water is introduced, in almost all cases bubbles of a more distinct character and more durable in nature will be formed. And if the adjustments and conditions of the parts of such a device as shown in Fig. 8 are correct, the entire mass of liquid (natural water) within the chamber can be turned into a bubbling body, as is illustrated in that figure. These bubbles of natural water, however, are fragile and vanish instantly on reaching the surface of the water body unless the water be charged with foreign material. The level of the liquid in the chamber, of course, rises to some extent during the action of the air to compensate for the increase in cubical content, because of the masses of air which are passing in bubble form through the liquid.

If now, into this vessel we introduce a properly regulated mass of pulverized ore, containing, for example, particles of copper sulfid, either introducing it as a dry powder and allowing it to gradually settle through the body of the liquid, or introducing it while commingled with another body of water so as to form a fluid pulp, there will occur within a few seconds or within a minute or two after the introduction, one of the phenomena which we avail ourselves of in carrying out our process. After the compressed air has been passed through the bottom septum and into the ore-charged water for a short period of time it will be observed that the bubbles (initially forming the water mass below its upper level) becomes much more tenacious and when they reach the surface adhere together, or coalesce to form larger and larger bubbles. The tenacity of these is such that after they reach the surface of the liquid mass, proper, they maintain their form for a relatively long period of time. These bubbles are strongly colored by the adhering film of the solid pulp material contained in the water, passing from one stage of darkness in color to another, according to the amount of crushed ore that is introduced in the water, sometimes even approaching a black olive, or a color equivalently dark.

But our observations have led us to conclude that these masses of solid materials that are carried upward by the bubbles through a shallow body of water (when water alone is used with the ore) show but little separation of the metalliferous or valuable parts from the non-metallic, earthy, or crushed rock parts.

Passing now to the matters of process and of mechanism which characterize our invention, and turning to Fig. 1 as presenting an illustration thereof, they consist, first, in supplying to the mass of water in the vat 1 not only a mass of crushed ore but also a quantum of oily matter. The latter may be of any of the numerous sorts which have the characteristic quality above described, as concerns their cohering tenaciously with, and forming films around particles of metal or metalliferous bodies. By preference (as will be below more fully described) instead of introducing the oil separately into the separating tank or vat 1, a preliminary mixture is prepared outside of the main tank, this mixture comprising both the ore and the oil material that is selected for the process, and comprising also sufficient water to effect an intimate commingling of the oil and of the solids before introducing them to the main separating chamber.

Upon the introduction of an oil suitable for the purpose, the phenomenon of bubble formation becomes much more strongly marked. The vesicles (which, as above noted), are incipient or more or less quickly evanescent when formed in plain natural water, as discussed in connection with the mechanism in Fig. 8, and which are made somewhat more tenacious and are somewhat larger, when formed in the water containing the crushed ore material, as discussed in connection with Fig. 9, now, because of the reciprocal action of the oil and the other bodies, become very tenacious and self-sustaining, as well as acting upon the metallic or metalliferous particles in the way above described. The bubble vesicles that are now formed are capable of carrying greater loads of the solid material.

A few seconds after the ore and oil have become disseminated through the body of water in the tank, and after the air is turned into the chamber below the bottom septum, an ebullition will be observed, large numbers of bubbles being formed at the bottom of the water receptacle. They rise rapidly, and as the pressure of the water mass above them decreases they at the surface become larger and larger, the bubble vesicles being elastic and tenacious. They form a practically continuous bubble body below the top plane of the water, proper, this body or mass of bubbles extending from side to side of the water holder, and from the bottom to the top. The bubbles may be considered as forming a large number of superposed, transversely arranged layers, which may be regarded as screens, in relation to the solid material. The latter is delivered to the vessel at a suitable horizontal plane of the water mass and normally tends to sink downward. But it cannot pass vertically from one horizontal plane to another through the water without contacting with, first, one, and then another, and then another of these cross strata of bubbles. The metallic or metalliferous particles, having preliminarily come into contact with the oil particles, are adhering thereto and are surrounded by oily films. This, of itself, tends to make these metallic or metalliferous particles more buoyant than they otherwise would be, and prepares them for the lifting action or effect of the bubbles formed in the pulp water and oil. The oily films on the particles of metal or metalliferous material cause them to adhere all the more firmly to the bubbles. Indeed, examination shows that the films or vesicles of the bubbles are largely constituted of the oil-jacketed solid particles; that is to say, the oil-coated particles become inserted into, or form part of the bubble films.

As already noticed, when the pulp or crushed ore is introduced into the plain natural water, its action is to increase the bubble-forming capacity of the water and air globules, and this action becomes still more enhanced upon the addition of the oil or like substance. The presence of the bubbles below the top surface of the water mass largely increases the cubical volume and the upper level of the liquid is considerably raised. We, for convenience, term this body of materials, extending from the lower septum to the raised water level, the pulp column.

As the bubbles reach the top of this pulp column, they continue to rise. We confine them, in order to cause them to rise as far as possible under the given conditions of working. Ordinarily, this bubble column, as we term it will rise to a height of from twelve to eighteen inches above the pulp column. Notwithstanding the fact that they are charged and coated with the solid metal and metalliferous particles, they are so tenacious and enduring that there is no serious tendency for them to rupture, even as they move along the walls which confine the bubble column and pile themselves, one upon another.

The striking phenomenon that we observed and discovered incident to this part of the operation is that when we cause them to thus form a vertically elongated bubble column, the richer or cleaner metal value parts of metal or metalliferous particles tend to gradually move toward the top stratum of the column. On the other hand, below a certain plane the tendency is for the solid particles not covered with oil, such as those of the crushed rock or earth, to settle backward toward the water or pulp column. In other words, there is a horizontal stratum transverse to the bubble column and a number of inches above the pulp column, where there are distinct planes of separation of one of the solid masses from the other, the one which is principally metallic or metalliferous traveling upward with the bubbles in the upper part of the bubble column, while those which have no metal in them stop their upward moving and tend to settle backward.

To utilize this action, we divide the bubble column on a horizontal plane lying in this cross stratum, that is, at the plane where the tendency is most clearly indicated for the traveling in opposite directions of these two classes of particles. We cause the upper, metal-carrying part of the bubble column to be removed from the latter in any of the several ways. By preference, we effect this by terminating the retaining walls of the column at this transverse horizontal plane, permitting those bubbles which are charged and coated with the metalliferous particles to flow over the upper edges of the walls. They are collected after escaping and carried off to a suitable receptacle.

The particles of non-metalliferous material, which, as above noted, after reaching a certain point of elevation tend to return to the pulp column, finally reach the lower part of the tank 1. And in order to make the process continuous, we withdraw them (together with the particles moving directly downward from the plane of ore introduction) from the lower part of the receptacle in a continuous stream or in interrupted charges, as preferred.

Considering now, more in detail, the mechanism illustrated in the drawings: 7 is a feed tank preferably situated directly above the separator tank 1. 8 is a vertical pipe or duct extending down from the feed tank to a proper point in the separator tank. At the lower end of this duct there is a sheet-forming or spray-forming device preferably in the form of a conical valve having a top plate of such shape as to cause the descending column of fluid to flow outward horizontally in a sheet or in a series of sprays so that the descending liquid and its contents shall be properly distributed to insure rapid action as concerns the bubbles and the solid particles. This valve, or spray-former, is carried by a rod 10 with which are combined suitable adjusting devices, as shown at 11, for regulating the position of the spray-former 9.

At 12 there is an escape duct for the gangue or earthy part of the ore after it has been separated from the metalliferous particles. This duct 12 leads to a valve box at 15, there being preferably between this box and the tank a control valve at 14. In the valve box 15 there is a valve 13 combined with devices which automatically control the discharge. These devices consist of a float valve 16 in a supplemental tank 19, a connecting rod 17, and a lever 18, flexibly connected to the stem of the valve 13.

The tank 19 is in communication with the separator tank 1 by means of a duct 20. This supplemental tank 19 not only constitutes a holder for the float valve but also a "sight" device by which the normal level of the liquid in the tank 1 can be ascertained at any time. The liquid in this tank 19 is not materially affected by the aerating of the liquid in the tank 1 and therefore the level which it indicates is approximately that to which the liquid in the tank 1 would normally settle if the air were cut off.

21 indicates a collecting device for receiving the overflow from the bubble column. As shown, it is annular in conformation with a sloping bottom at 22. This causes the material collected in it to move downward to the place of discharge at 23. From the discharge point it can be carried to any suitable receptacle for subsequent treatment.

The feed tank can be initially supplied with material in any preferred way. We have shown a storage tank at 24 in which the pulp can be placed, this consisting of water with a properly regulated quantity of pulverized ore mixed therewith. The oil, when used, can be introduced into the pulp either by flowing it into this storage tank; or the oil and ore can be brought together preliminarily in a mixing apparatus, with sufficient quantity of water if found necessary. The flow of pulp to the feed tank can be automatically controlled by means of the valve at 25 and the float at 26, connected to the valve by a vibrating lever 27.

With a mechanism of this sort the feeding of the material to the separator tank and the withdrawal of the waste therefrom, can be so regulated that the process shall be continuous.

The plane of separation of the upper part of the bubble column from the lower part can be best or preferably, varied by varying the height of the pulp column. This can be accomplished by regulating the supply of the pulp and the withdrawing of the gangue from the bottom; such regulating being effected by properly adjusting the float valves or other control devices.

Another way for varying the plane of the separation of the upper part of the bubble column from the lower part is illustrated in Fig. 4 where the collector at 21ᵃ is shown as loosely mounted around the upper part of the main tank 1 and when it is raised or lowered, the place of escape for the bubbles will be correspondingly varied.

Figs. 4, 5 and 6 illustrate the further fact that there can be changes made in a number of the parts without departing from the invention. The main tank 1ᵃ here is extended laterally and is relatively shorter vertically than is the case in Figs. 1 and 2, but the air chamber at 2ᵃ, the bottom septum 5ᵃ, the valves at 14ᵃ, 13ᵃ, the controlling devices at 16ᵃ, 17ᵃ, and 18ᵃ, are substantially similar to those above described. The feeding chamber at 7ᵃ is somewhat smaller than the feed tank shown in Figs. 1 and 2, the spray-former 9, with its adjusting rod 10ª, and the surrounding tube 8ª, being substantially like those above set forth. The collector at 21ª has its inner wall 21ᵇ extended vertically somewhat more than is the case in Figs. 1 and 2 and is fitted around the tank 1ª.

In the description above, we have referred to the introducing of air in the air chamber 2, but wish it to be understood that other gases can be employed in carrying out our invention to meet varying circumstances.

Having thus described our invention, what we claim is:

1. An ore-concentration process, which comprises the operations of charging a vessel with a flowing pulp consisting of crushed ore, water and a froth-producing and mineral-selecting agent, introducing a gas through a fine-texture porous medium into said ore pulp and forming bubbles to which certain mineral particles of the ore adhere as said bubbles rise through the pulp, causing said mineral-bearing bubbles to form a column of bubbles above the pulp, and separating the mineral carried by the bubbles in the upper part of the bubble column from the remainder of the ore.

2. An ore-concentration process, which comprises the operations of charging a vessel with a flowing pulp consisting of crushed ore, water and a froth-producing and mineral-selecting agent, introducing a gas through a fine-texture porous medium into said ore pulp and forming bubbles to which certain mineral particles of the ore adhere as said bubbles rise through the pulp, causing said mineral-bearing bubbles to form a column of bubbles above the pulp, separating the mineral carried by the bubbles in the upper part of the bubble column from the remainder of the ore, and maintaining the liquid level of the pulp substantially constant during the separating operation.

3. An ore-concentration process, which comprises the operations of charging a vessel continuously with a flowing pulp consisting of crushed ore, water, and a froth-producing and mineral-selecting agent, introducing a gas through a fine-texture porous medium into said ore pulp and forming bubbles to which certain mineral particles of the ore adhere as said bubbles rise through the pulp, causing said mineral-bearing bubbles to form a column of bubbles above the pulp, separating the mineral carried by the bubbles in the upper part of the bubble column from the remainder of the ore, and continuously and separately carrying off the separated mineral and the ore remainder.

4. An ore concentration process which comprises the operations of charging a vessel with a flowing pulp consisting of crushed ore and water, introducing a gas through a fine-texture porous medium into said ore pulp in the presence of a froth-producing and mineral-selective agent, thereby forming bubbles to which certain mineral particles of the ore adhere as said bubbles rise through the pulp, causing said mineral-bearing bubbles to form a column of bubbles above the pulp, and separating the mineral carried by the bubbles in the upper part of the bubble-column from the remainder of the ore.

In testimony whereof we affix our signatures in the presence of two witnesses:

ROBERT S. TOWNE.
FREDERICK B. FLINN.

Witnesses:
DONALD CHARLES BROWN.
LILLIE METRA.